United States Patent Office 3,336,255
Patented Aug. 15, 1967

3,336,255
FLUOROELASTOMER VULCANIZATES AND
METHOD FOR MANUFACTURING SAME
Jerry K. Sieron, Dayton, Ohio, assignor to the United
States of America as represented by the Secretary of
the Air Force
No Drawing. Filed Dec. 18, 1963, Ser. No. 331,632
7 Claims. (Cl. 260—41)

ABSTRACT OF THE DISCLOSURE

Fluoroelastomer composition of matter containing copolymer of 100 parts vinylidene fluoride and perfluoropropylene with 15 parts magnesium oxide and 3 parts N,N'-dicinnamylidene-1,6-hexanediamine reinforced with from 30 to 50 parts pyrolyzed fibers as a vulcanizate, and process by which it is made, used as a strong and tough flexible moldable fluoroelastomer product up to 600° F. of a tensile strength up to 2510 p.s.i.

---

The invention described herein may be manufactured and used by or for the United States Government for governmental purposes without payment to me of any royalty thereon.

This invention relates to a new and improved fluoroelastomer compound that is reinforced with pyrolyzed fibers and to the method by which it is made.

Fluoroelastomer vulcanizates, of which co-polymers of vinylidene fluoride and perfluoropropylene are examples, demonstrate good resistance to high-temperature aging. Many of the important applications in which these fluoroelastomer vulcanizates might otherwise have been found useful were impeded by the poor tensile strength, tear strength, and elongation exhibited by the vulcanizates at elevated temperatures in the order from 300 to 600° F., which correspond respectively to 149 to 316° C.

In an effort to improve these high temperature physical properties of the prior fluoroelastomer vulcanizates, the prior art quite logically sought to apply to fluorocarbons the teachings and the techniques that had accomplished desirable results in the case of hydrocarbon elastomers.

Attempts were made to improve the high temperature properties of the fluoroelastomer vulcanizates by the addition of such typical reinforcing materials as carbon black, fine particle size silica, clay, colloidal alumina, aluminum silicate monohydrate, and the like.

While these carbon black and mineral-type reinforcements are normally effective in improving the physical characteristics of some hydrocarbon elastomers, it was observed that when incorporated with fluoroelastomers they either offerred no improvement in high-temperature strength or yielded a nominal improvement in strength accompanied by the simultaneous creation of unfavorable properties, such as, stiffness, low elongation or poor compression set. In some mixtures, the materials which produced striking effects when incorporated with hydrocarbon elastomers acted essentially as inert fillers when combined with fluoroelastomer compounds.

It is, accordingly, an object of this invention to provide improved fluoroelastomer vulcanizates.

It is another object of the invention to provide fluoroelastomer vulcanizates which at elevated temperatures possess improved tensile strength along with other desirable high-temperature properties.

Another object of the invention is to provide fluoroelastomer vulcanizates which exhibit greatly improved tear strength over the complete useful temperature range. This characteristic is particularly advantageous in the molding of fluoroelastomer products which are particularly subject to tearing when they are removed from hot rolls or presses.

A more specific object of the present invention is the provision of fluoroelastomer vulcanizates of improved high-temperature properties.

Another object of the invention is to provide a method for producing new and improved fluoroelastomer vulcanizates that are characterized by high-temperature strength, elongation, and heat-aging resistance.

These, and other objects and advantages, which will be apparent from the following disclosure, are achieved by the incorporation with the fluoroelastomers of high-temperature resistant fibers and, particularly, pyrolyzed fibers, carbon-based fibers, and the like, that result from the heating of cellulosic fibers at temperatures ranging from 1300 to 5400° F. in inert or in reducing atmospheres.

These fibers in the form of a mat, a fabric, or in discrete staple lengths, in the order of from one-eighth inch to one inch, are preferably admixed with the fluoroelastomer by milling or blending for a sufficient length of time to reduce the fibers to microscopic lengths and still retain their fibrous characteristics. The resulting admixtures are subjected to vulcanization operations described herein. The vulcanizates are characterized by a very substantial increase in their high-temperature strength. The known resistance of the fluoroelastomers to high-temperature aging is enhanced.

The process consists of uniformly dispersing the pyrolyzed fiber in a fluoroelastomer compound by mixing on a two-roll rubber mill for a sufficient period of time to reduce the fibrous material to microscopic size in the elastomer material. The pyrolyzed fiber is prepared by heating organic fibers at temperatures ranging from 1300 to 5400° F., which on the centigrade scale is from 704 to 2982° C., in an inert or a reducing atmosphere. The pyrolyzed fiber reduction is such that although it is invisible to the naked eye, microscopic examination of the fibrous material reveals that the fibers retain their spiral configuration and their other fibrous characteristics. The resultant vulcanizates containing the dispersed microfibers exhibit greatly improved high-temperature tear strength, which is of particular importance in removing molded pieces from the mold, and heat-aging resistance as compared with prior devices of corresponding type available in the art. The pyrolyzed fiber reduced to microscopic size as a reinforcing and a heat stabilizing material in fluoroelastomer compositions is believed to be novel.

The present invention provides a material for preparing articles such as O-rings, hose, damping devices, and the like. Seals used in pneumatic and hydraulic systems that are subjected to unusual stresses from high temperatures and high pressures represent a logical use for the new material.

The types of pyrolyzed fibers that are recited in this disclosure are defined by the following nomenclature:

| Heating Temperature, °F. | Fiber Type | Carbon Content |
|---|---|---|
| 1,300–1,700 | Partially carbonized | Up to 90%. |
| 1,300–1,700 | Carbon | 91 to 98%. |
| 4,900–5,400 | Graphite | Greater than 98%. |

The resultant pyrolyzed fiber has a carbon content by weight of preferably between 91 and 99.6 percent, although beneficial results are exhibited by a carbon content as low as 50 percent. Since the pyrolyzation of these fibers is accomplished from 1300 to 5400° F., which corresponds to 704 to 2982° C., this temperature range may be taken as being representative.

In the practice of the present invention, an illustrative fluoroelastomer compound comprises about one hundred parts by weight of vinylidene fluoride-perfluoropropylene copolymer admixed with fifteen parts of magnesium oxide and three parts of N,N'-dicinnamylidene-1,6-hexanediamine. A preferred carbon-based fibrous material is incorporated with the elastomeric composition.

The pyrolyzed or carbon-based fibers which are available are prepared in any of the presently known methods, such as, by a single crystal growth in a carbon electric arc under high-pressure inert gas; a terminal deposition from a hydrocarbon gas; by pyrolysis of organic fibers or the like. The last-mentioned controlled thermal conversion of organic fibers to residual carbonaceous materials is preferred.

Any of several types of fibers may be used as precursors for synthesis of the chosen carbon-based fibers. Suitable fibers are cellulose from wood, cotton, flax, hemp, or the like, regenerated cellulose, such as, cellulose acetate viscose cuprammonium and saponified acetate types, etc. The fibers are heated under suitable time-temperature conditions in either an inert atmosphere such as nitrogen, argon, helium, etc., or in a reducing atmosphere such as hydrogen, hydrocarbon gas, etc., until the product is a pyrolyzed fiber that is usable in the present invention.

The following table gives typical formulations and the data determined experimentally clearly show the advantages claimed for the pyrolyzed fiber-reinforced compositions over the control formulations in Columns A and B that contain medium thermal carbon black as the reinforcing agent, in lieu of the pyrolyzed fibers that are preferred.

five-step cure to 400° F., or 204° C., at which latter temperature they are held for an additional 24 hours.

Tensile strength is given in pounds per square inch. Elongation is a percentage of the original length. Hardness is measured on the A scale of a Shore Dourometer. Tear strength is given in pounds per inch as measured using ASTM Die B.

The results of the above-described tests demonstrate that fluoroelastomer vulcanizates that are prepared according to the present invention, at the higher temperatures designated, retain 30% of their room temperature tensile strength, as compared with only 15% retention by the conventional colloidal carbon black filled vulcanizates in the columns A and B.

A further advantage of using the pyrolyzed fiber and an advantage that was unexpected, is that the compositions embodying the present invention possessed greatly improved heat-aging resistance. After 72 hours at 600° F. in a hot-air oven, specimens molded from the pyrolyzed fiber reinforced fluoroelastomer admixtures were quite flexible and retained considerable strength and elongation characteristics in comparison with the conventional carbon black reinforced vulcanizates which were very brittle and fractured when bent 180° after a similar heat-aging cycle.

It will be apparent from the foregoing data that the present invention provides stocks that are reinforced with the high-carbon and high-graphite of pyrolyzed fiber compositions at both the 30- and 50-part concentrations which are superior to the corresponding carbon black compounds in the Columns A and B.

| Formulation | Compound (Parts by weight) | | | | | | | |
|---|---|---|---|---|---|---|---|---|
| | A | B | C | D | E | F | G | H |
| Vinylidene fluoride and perfluoropropylene copolymer | 100 | 100 | 100 | 100 | 100 | 100 | 100 | 100 |
| Magnesium oxide | 15 | 15 | 15 | 15 | 15 | 15 | 15 | 15 |
| N,N'-dicinnamylidene-1,6-hexanediamine | 3 | 3 | 3 | 3 | 3 | 3 | 3 | 3 |
| Medium thermal carbon black | 30 | 50 | | | | | | |
| Carbon fabric (94.8% carbon) | | | 30 | 50 | | | | |
| Carbon fiber (97% carbon) | | | | | 30 | 50 | | |
| Graphite fiber (99.6% carbon) | | | | | | | 30 | 50 |
| Original at 75° F.: | | | | | | | | |
| Tensile strength | 2,920 | 2,570 | 2,200 | 2,150 | 2,230 | 2,510 | 2,010 | 2,010 |
| Elongation | 280 | 200 | 230 | 160 | 170 | 115 | 260 | 125 |
| Hardness | 81 | 90 | 81 | 90 | 80 | 92 | 81 | 91 |
| Original at 400° F.: | | | | | | | | |
| Tensile strength | 430 | 520 | 520 | 490 | 640 | 660 | 580 | 610 |
| Elongation | 115 | 090 | 120 | 080 | 100 | 090 | 105 | 065 |
| Aged 16 hours at 600° F., tested at 75° F.: | | | | | | | | |
| Tensile strength | 1,510 | 1,140 | 1,380 | 1,100 | 1,590 | 1,550 | 1,460 | 1,570 |
| Elongation | 205 | 210 | 195 | 160 | 155 | 115 | 175 | 100 |
| Hardness | 80 | 91 | 81 | 92 | 80 | 88 | 87 | 95 |
| Aged 72 hours at 600° F., tested at 75° F.: | | | | | | | | |
| Tensile strength | 680 | 1,180 | 500 | 1,150 | 610 | 760 | 670 | 1,190 |
| Elongation | 040 | 015 | 100 | 015 | 085 | 070 | 035 | 025 |
| Hardness | 92 | 100+ | 89 | 99 | 90 | 96 | 95 | 100+ |
| Tear strength: | | | | | | | | |
| At 75° F | 140 | | 190 | | 215 | | 176 | |
| At 400° F | 12 | | | | 32 | | | |
| Percent compression set aged 24 hours at 400° F., 25% compression | 32 | | | | 34 | | | |
| Aged 96 hours at 600° F., tested at 75° F.: | | | | | | | | |
| Tensile strength | | | 720 | | | | | |
| Elongation | | | 040 | | | | | |
| Hardness | | | 92 | | | | | |

The compositions in the columns headed by the letters A and B in the above chart were used as illustrative controls and contained carbon black instead of the pyrolyzed fiber. The compositions in the columns A and B are used for comparison purposes with the other compositions that are disclosed herein. The compositions in the columns headed by the letters C, E, and F are preferred as illustrative reductions to practice of the present invention. In the above chart, samples made from the compositions in the columns below the letters C, E, and F, following their aging for 72 hours at 600° F., which corresponds to 316° C., were successfully bent 180° without fracture.

Test specimens of the present invention are press-cured for 60 minutes at 300° F., or 149° C., to form slabs. The slabs are post-cured in a circulating hot air oven by a The hot-air aging resistance of the compounds in columns E and F at 600° F. with both the 30- and 50-part concentrations of 97 percent carbon pyrolyzed fibers is particularly noteworthy. It is of particular importance that even after aging in a circulated hot-air oven for 72 hours at 600° F., the compounds in the columns C, D, E, and F, that contain pyrolyzed fibers having carbon contents in the range from 91 percent to 98 percent cabon, were flexible and could be bent 180° without breaking, as previously noted.

The retention of the elongation characteristic and the resistance to increased hardness, are in some installations probably more important than tensile strength retention fo sustained heat-aging at 600° F. In this respect, the compositions containing the high-carbon content pyrolyzed fibers that are disclosed herein are far superior to the normally employed carbon black-containing compositions.

This superiority was also demonstrated in tests where the carbon pyrolyzed fiber-reinforced compounds, such as those in the composition disclosed in column C, were subjected to high-temperature aging at 600° F. for 96 hours. The column C compound remained flexible and retained a considerable tensile strength and elongation, as compared with the embrittled condition of the carbon black-reinforced control compounds disclosed in columns A and B. After this 96 hour high-temperature exposure, the specific compound C showed a tensile strength of 720 pounds per square inch, a Shore A hardness of 92, and an elongation of 40 percent.

Tear strength tests indicate that while the control compound A in the above examples has a tear strength of 140 pounds per square inch at 75° F. and 12 pounds per square inch at 400° F., the pyrolyzed fiber compositions disclosed in the columns C, E, and G at 75° F. had tear strengths of 190 pounds per square inch, 215 pounds per square inch, and 176 pounds per square inch, respectively.

When the compound E was tested for tear strength at 400° F. it showed a strength of 32 pounds per inch, which is a substantial improvement over the control compounds in the columns A and B.

The greatest improvements in tear strength at both room and elevated temperatures are exhibited in the cases of the high-viscosity and high-molecular weight fluoroelastomers. They are especially significant in the case of the fluoroelastomer vulcanizates in that the same have heretofore shown a marked tendency to tear upon removal from a mold. The teachings of the present invention overcome this tendency and substantially expand the potential use of these materials.

Further experiments with partially carbonized fibers having carbon contents of from 50 to 91 percent have demonstrated that the overall heat-aging and high-temperature performance characteristics of compounds so reinforced provide an improved high-temperature tensile strength retention.

Illustratively, when 30 parts of such a partially carbonized fiber of 54.2 percent carbon content admixed with the basic composition containing 100 parts by weight of the chosen elastomer, the test sample showed an original tensile strength of 2100 pounds per square inch, 195% elongation and a Shore A hardness of 80 points at 75° F. and a tensile strength retention of 570 pounds per square inch and an elongation of 120% at 400° F. After aging for 16 hours at 600° F. the sample so tested at 75° F. disclosed a tensile strength of 1510 pounds per square inch, an elongation of 100% and a Shore A hardness of 86 points. In the compounding, using the partially carbonized fiber, it is found that the best results were achieved if one additional part of the N,N'-dicinnamylidene-1,6-hexanediamine per hundred parts of the fluoroelastomer was added.

The pyrolyzed fabric particles used should preferably be such that in the final product the pyrolyzed particles are thoroughly and uniformly distributed throughout the elastomeric base and are in discrete form of microscopic or near microscopic dimensions and practically invisible to the unaided eye. Optimum high-temperature strength retention and age resistance are achieved where the fibers remain of sufficient size to retain their fibrous characteristics. While, in general, the pyrolyzed fibers are further broken down in length and more uniformly dispersed the longer they are worked on a two-roll mill, for example, milling for more than 60 minutes produces no substantial change in their physical characteristics. Tensile strength and elongation reach an equilibrium at both room temperature and at 400° F. after the composition containing the pyrolyzed fibers has been worked for an hour.

The chemical change involved in this pyrolysis is, in effect, the stripping away of the hydrogen and oxygen atoms from the organic macromolecules until the final product is largely elemental amorphous carbon. X-ray analysis has confirmed that the interatomic distances between the carbon atoms within the original monomer units are maintained in the pyrolyzed structure and the polymer carbon crystallites appear to have a size identical to those in the nonpyrolyzed molecules. The spiral crystal form present in the precursory cellulose is apparently retained in the carbonized fiber, thus imparting some degree of flexibility and resiliency to the carbonaceous structure.

Experimentally, in the present invention, pyrolyzed fibers of all of the classes contemplated with carbon contents ranging from approximately 50 percent to 99.6 percent yielded an end product that is characterized by an improved tensile strength when subjected to temperatures up to 600° F., which corresponds for purposes of convenient comparison to 316° C. The very high percentage carbon fibers and the graphite fibers not only provide increased high-temperature strength to the end product but, also, provide the best resistance to aging at the temperatures tested.

In the practice of the present invention, the above-identified examples of fiber classes, regardless of the physical form in which they are used, whether as fabric, a mat, discrete fibers, or the like, are mixed into a fluoroelastomer gum on a two-roll mill for a sufficient time to reduce the admixed fibers to microscopic but discrete lengths in the elastomer matrix. Approximately 60 minutes of milling is required to reach equilibrium conditions. With the aid of conventional compounding, the composite materials are easily vulcanized and present a composition that displays greatly improved hot tensile strength, heat-aging resistance and tear strength.

While the within disclosed invention has been described in considerable detail in connection with the stipulated specified examples and preferred embodiments thereof, it is to be understood that the foregoing disclosure has been for the purpose of illustrating the present invention without limiting the scope of the invenion defined in the subjoined claims.

I claim:

1. A fluoroelastomer composition containing a copolymer of vinylidene fluoride and perfluoropropylene reinforced with from about 30 to 50 weight percent of pyrolyzed fibers selected from the group consisting of cellulose from wood, cotton, flax and hemp, cellulose acetate, and viscose cuprammonium, of carbon content ranging from approximately 30 through 99.6 weight percent and the fibers in the end product being of substantially microscopic lengths distributed substantially uniformly through the copolymer.

2. The composition defined by claim 1 wherein the pyrolyzed fiber is an organic fiber heated at a temperature about in the range of from 1300° F. to 5400° F.

3. The composition defined by claim 1 wherein the fluoroelastomer compound comprises by weight a mixture of about one hundred parts of vinylidene fluoride-perfluoropropylene copolymer mixed with about fifteen parts of magnesium oxide and about three parts of N,N'-dicinnamylidene-1,6-hexanediamine.

4. The composition defined by claim 1 as a fluoroelastomer vulcanizate aged for 72 hours at 600° F., then bent 180° without fracture.

5. The process of making a fluoroelastomer compound reinforced with pyrolyzed fibers as a vulcanizate by incorporating together by weight one hundred parts of vinylidene fluorideperfluoropropylene copolymer mixed with fifteen parts of magnesium oxide and three parts of N,N'-dicinnamylidene-1,6-hexanediamine and about from thirty to fifty parts of pyrolyzed fiber in discrete staple lengths in the order of from one-eighth inch to one inch and in general from 50 and preferably from 91 to 99.6 percent carbon content by weight, milling the mix for up to an hour for substantially uniformly dispersing the pyrolyzed fiber throughout the fluoroelastomer compound in reaching equilibrium conditions, and vulcanizing the composite materials.

6. The process defined in claim 5 inclusive of milling the fluoroelastomer compound and pyrolyzed fiber mix on a rubber mill in reducing the fiber to microscopic size.

7. The process defined in claim 5 wherein the pyrolyzed fibers are organic fibers heated at temperatures ranging from 1300° F. to 5400° F. until the pyrolysis of the organic fibers is accomplished.

No references cited.

MORRIS LIEBMAN, *Primary Examiner.*

ALLAN LIEBERMAN, *Examiner.*